(12) United States Patent
Hogle et al.

(10) Patent No.: US 6,579,022 B1
(45) Date of Patent: Jun. 17, 2003

(54) KEYBOARD SUPPORT PLATFORM

(75) Inventors: Glenn Hogle, La Mesa, CA (US);
Michael Roeder, San Diego, CA (US);
Sherri Hogle, La Mesa, CA (US)

(73) Assignee: Active Input Solutions, LLC, San Diego, CA (US)

( * ) Notice: Subject to any disclaimer, the term of this patent is extended or adjusted under 35 U.S.C. 154(b) by 0 days.

(21) Appl. No.: 09/521,581

(22) Filed: Mar. 9, 2000

(51) Int. Cl.[7] .................................................. B41J 29/06
(52) U.S. Cl. ...................................... 400/681; 400/472
(58) Field of Search ................................ 400/681, 679, 400/680, 682, 715, 492, 472; 341/21, 22; 248/118, 118.1–118.5

(56) References Cited

U.S. PATENT DOCUMENTS

| | | | |
|---|---|---|---|
| 3,663,779 A | * 5/1972 | Gerlach et al. | 100/168 G |
| 4,225,988 A | 10/1980 | Cary et al. | 5/61 |
| 5,037,054 A | * 8/1991 | McConnell | 248/284 |
| 5,351,897 A | * 10/1994 | Martin | 244/118 |
| 5,541,593 A | 7/1996 | Arsem | 341/22 |
| 5,564,844 A | 10/1996 | Patterson, Jr. et al. | 400/492 |
| 5,642,109 A | * 6/1997 | Crowley et al. | 400/481 |
| 5,648,771 A | * 7/1997 | Halgren et al. | 341/22 |
| 5,806,115 A | 9/1998 | Brown | 5/615 |
| 5,951,179 A | 9/1999 | Zarek | 400/492 |
| 6,036,271 A | 3/2000 | Wilkinson et al. | 297/452.41 |
| 6,161,806 A | 12/2000 | Crosson | 248/118.3 |
| 6,256,018 B1 | 7/2001 | Zarek | 345/168 |

* cited by examiner

Primary Examiner—Anthony H. Nguyen
(74) Attorney, Agent, or Firm—John L. Rogitz

(57) ABSTRACT

A keyboard support platform includes a keyboard support plate hingedly attached to a base. A motorized drive assembly or an inflatable bladder urges the keyboard support plate to move from a position below horizontal, through a horizontal position, to a position above horizontal. A computer keyboard may be placed on the keyboard support plate. Accordingly, as the keyboard support plate moves the keyboard will also move. While a user is typing, he or she will have to follow the motion of the keyboard thereby causing the position of his or her wrist to continuously change. As such, the risk of developing computer-related hand and wrist injuries such as Carpal Tunnel Syndrome, tendinitis, and static muscle fatigue from keeping the wrist motionless while typing for extending periods of time is reduced.

6 Claims, 5 Drawing Sheets

KEYBOARD SUPPORT PLATFORM

TECHNICAL FIELD

The present invention relates to computer keyboard support structures.

BACKGROUND OF THE INVENTION

With increased computer usage in the home and office, a very common injury is repetitive stress injury, including Carpal Tunnel Syndrome (CTS). A major cause of CTS is repetitive motion, e.g., typing at a computer for an extended period of time. During the act of typing, the flexor tendons leading from the forearm to the thumb and fingers rub against the interior wall of the carpal tunnel. Without breaks in the movement or changing wrist position, tendons become inflamed due to an increase in intracarpal pressure (ICP) which, in turn, leads to a lack of proper blood flow. If the tendons in the carpal tunnel become inflamed, pressure may be put on the medial nerve at the wrist thereby causing pain, numbness, tingling, and weakness in the thumb and fingers.

CTS caused by typing can be prevented with proper posture, proper typing technique, proper equipment set up, and exercise. Not surprisingly, devices have been introduced to minimize the risk of developing CTS from typing. One such device is disclosed by U.S. Pat. No. 5,564,844 (the "'844 patent"), which discloses a cam-driven platform onto which a keyboard is placed. The platform is hinged to a base plate, and a motorized cam moves the platform from a horizontal position to an angled position above horizontal. The '844 patent is designed to minimize the possibility of developing CTS by preventing the wrist from remaining in the same position for an extended period of time while typing.

In order to provide the most beneficial range of motion, it happens that a device such as the '844 patent should move the wrist through what is known as the "neutral zone." The neutral zone is a zone of wrist movement in which the wrist is moved from a point of flexion approximately thirty-five degrees (35°) below horizontal, across the horizontal (zero degrees), to a point of extension fifteen degrees (15°) above horizontal. On the other hand, wrist movement outside the neutral zone, i.e., beyond thirty degrees below horizontal or fifteen degrees above horizontal, excessive flexion without opposing extension, or excessive extension without opposing flexion, can cause unacceptable ICP greatly increasing the likelihood of developing CTS.

The design of the '844 patent, unfortunately, does not appear to allow the platform to move in such a manner that causes the wrist to move through the neutral zone while typing. More specifically, the '844 patent does not appear to provide any wrist flexion. As a result, the '844 patent forces the user into excessive extension without any opposing flexion. As recognized herein, the '844 patent consequently does not provide the full range of motion necessary to completely minimize the risk of developing CTS.

The present invention has recognized these prior art drawbacks, and has provided the below-disclosed solutions to one or more of the prior art deficiencies. More specifically, the present invention provides a keyboard support platform that moves continuously from an angle below horizontal, through a horizontal position, and to an angle above horizontal.

SUMMARY OF THE INVENTION

A keyboard support platform includes a base, a keyboard support plate hingedly attached to the base, and a drive assembly that further includes a motor coupled to the keyboard support plate. The drive assembly pivots the support plate with respect to the base from a position below horizontal, across a horizontal position, to a position above horizontal. Alternatively, the motorized drive assembly can be replaced by an inflatable air bladder, as described further below.

In a preferred embodiment, the keyboard support platform includes a limiting mechanism that is electrically coupled to the motor. Preferably, the limiting mechanism cycles the keyboard support plate back and forth across the horizontal position. In a presently preferred embodiment, the base includes a rear plate, a left side plate that extends from the rear plate, a right side plate that extends from the rear plate, a front plate that connects the left side plate and the right side plate, and a bottom plate that supports the rear plate, the left side plate, the right side plate, and the front plate. Preferably, the keyboard support plate is hingedly attached to the rear plate.

Also, in a preferred embodiment, the drive assembly includes a stationary block that is attached to the bottom plate, at least two guide rails that extend from the rear plate to the stationary block, a moving block that is slidably disposed on the guide rails, and a drive screw that is threadably engaged with the moving block and coupled to the motor. As intended by the present invention, as the drive screw rotates, it urges the moving block to move linearly. The keyboard support platform also includes a moving arm that is pivotably attached to the moving block and the keyboard support plate. Preferably, as the moving block moves, the moving arm urges the support plate to pivot with respect to the rear plate. In another embodiment of the present invention, a keyboard support platform includes a base that has a pivot plate extending from a bottom plate and a keyboard support plate that is hingedly attached to the pivot plate. This embodiment also includes a moving block that is slidably disposed relative to the pivot plate and a drive screw that is engaged with the moving block. The drive screw urges the moving block to move linearly as the drive screw rotates. Additionally, a moving arm is pivotably attached to the moving block and the keyboard support plate. As described in detail below, the moving arm urges the keyboard support plate to pivot with respect to the pivot plate.

In yet another embodiment of the present invention, a method for continuously cycling a computer keyboard from a tilt up orientation, through a horizontal orientation, to a tilt down orientation includes providing a keyboard support platform, placing a computer keyboard on the platform, and then moving the platform between the tilt up and tilt down orientations.

The present invention will now be described, by way of example, with reference to the accompanying drawings, in which:

DESCRIPTION OF AN EMBODIMENT OF THE INVENTION

Figure 1:
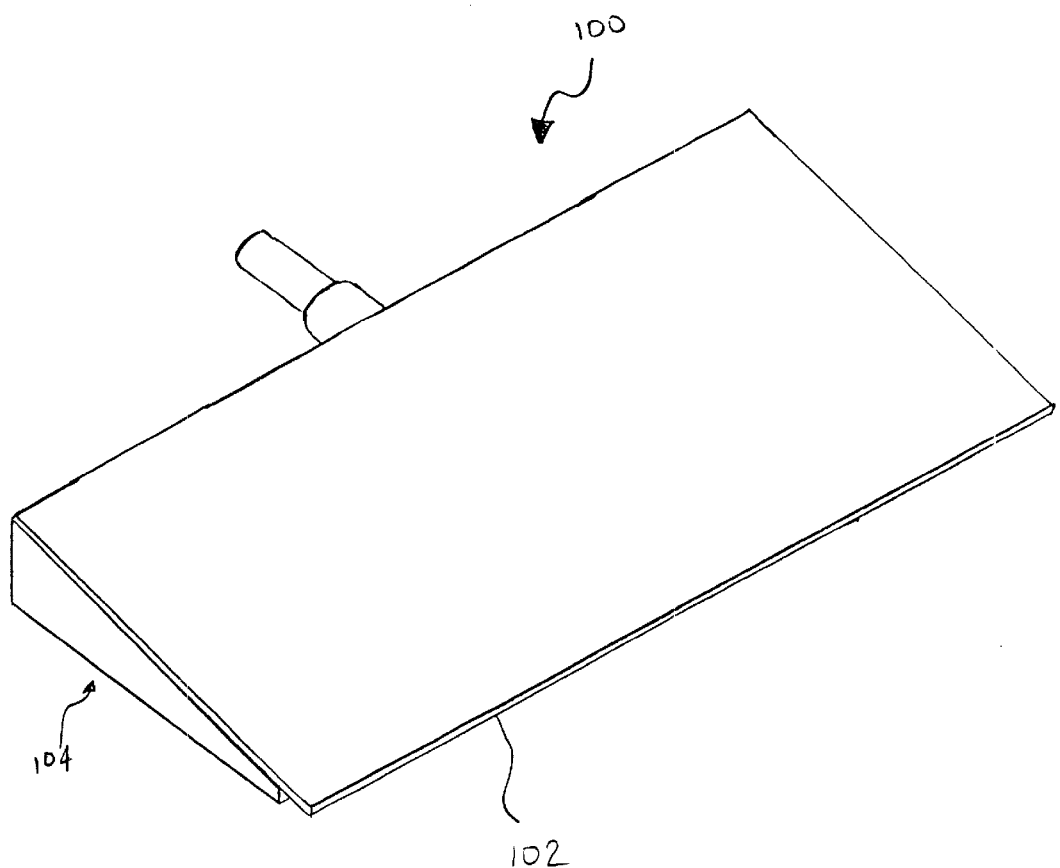
FIG. 1 is a perspective view of the keyboard support platform.
Figure 2:
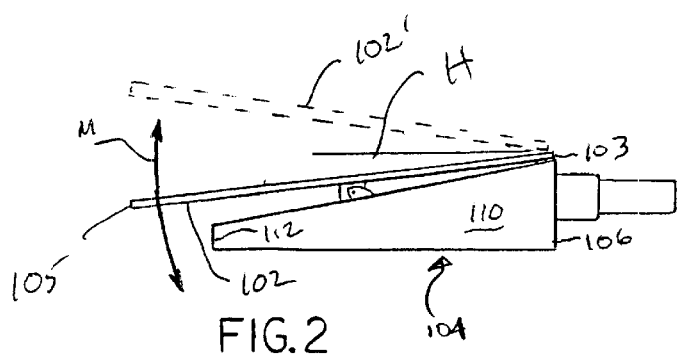
FIG. 2 is a side plan view of the keyboard support platform.

Referring initially to FIG. 1, a keyboard support platform is shown and generally designated 100. FIGS. 1 and 2 show that the keyboard support platform 100 includes a generally flat keyboard support plate 102 hingedly attached to a hollow, generally box-shaped base 104. In accordance with the present invention and as more fully disclosed below, the support plate 102 pivots about a rear edge 103, shown in FIG. 2, between a tilt down orientation, shown in solid lines at 102 in FIG. 2, wherein the plane of the plate 102 is angled below the horizontal plane "H" that contains the rear edge 103, and a tilt up orientation, shown in dashed lines at 102' in FIG. 2, wherein the plane of the plate 102 is angled above the horizon "H." Thus, the front edge 105 of the plate 102 passes back and forth through the horizontal plane "H" as indicated by motion arrows "M." It is to be understood that the movement of the plate 102 causes the user's wrist to move back and forth through the horizontal plane between a point of flexion approximately thirty five degrees (35°) below horizontal and a point of extension approximately fifteen degrees (15°) above horizontal, i.e., the user's wrist moves within the neutral zone while he or she is typing. It is also to be understood that alternatively, the plate 102 can pivot about the front edge 105 in accordance with present principles, or indeed about any pivot axis between the front and rear edges.

Figure 3:
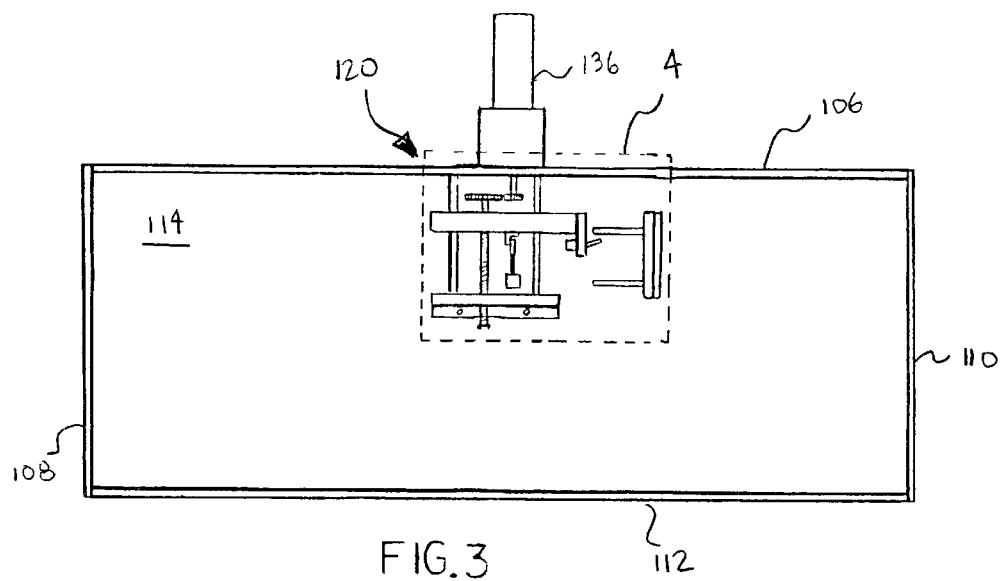
FIG. 3 is an overhead plan view of the keyboard support platform with the support plate removed for clarity.

Now referring to FIG. 3, the base 104 includes a rear pivot plate 106, a left side plate 108, a right side plate 110, and a front plate 112. It is to be understood that alternatively, one or more of the plates 106, 108, 110, 112 can be formed integrally with the support plate 102 instead of the base 104, to strengthen the support plate 102 particularly when it is made of plastic. Moreover, one or both of the plate 102/base 104 can be formed with ribbing, for strength.

In the embodiment shown in FIG. 3, however, the left and right side plates 108, 110 extend perpendicularly from the rear pivot plate 106 and are attached to the front plate 112 to form the exterior wall of the base 104. The exterior wall is attached to a bottom plate 114 to give the base 104 its box shape.

Referring back to FIG. 2, in one preferred embodiment, the rear pivot plate 106 is higher than the front plate 112. Moreover, each side plate 108, 110 includes an upper edge that is tapered from the top of the rear pivot plate 106 to the top of the front plate 112 to yield a generally wedge-shaped appearance as shown in FIG. 2. As stated above, the rear edge 103 of the keyboard support plate 102 is hingedly attached to the top of the rear pivot plate 106 such that it can pivot along the arc shown by the arrows "M" from a position below the horizon "H" to a position above the horizon "H."

Figure 4:
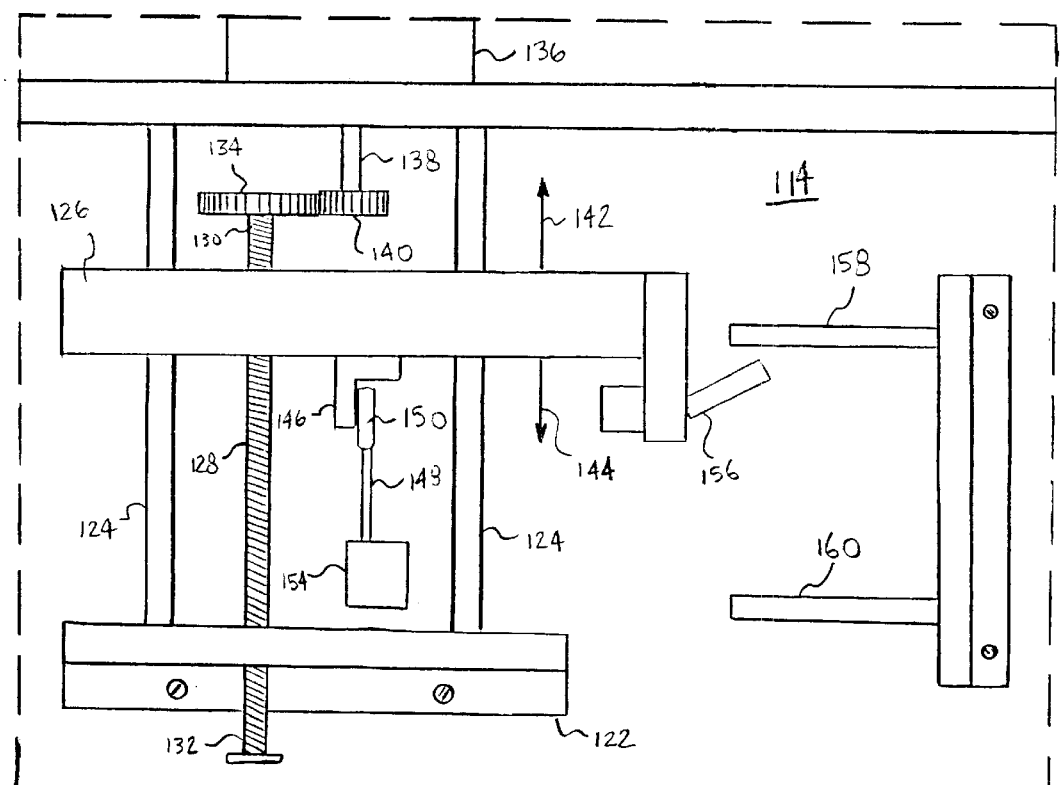
FIG. 4 is a detailed view of the drive mechanism as indicated by dashed box 4 in FIG. 3.
Figure 5:
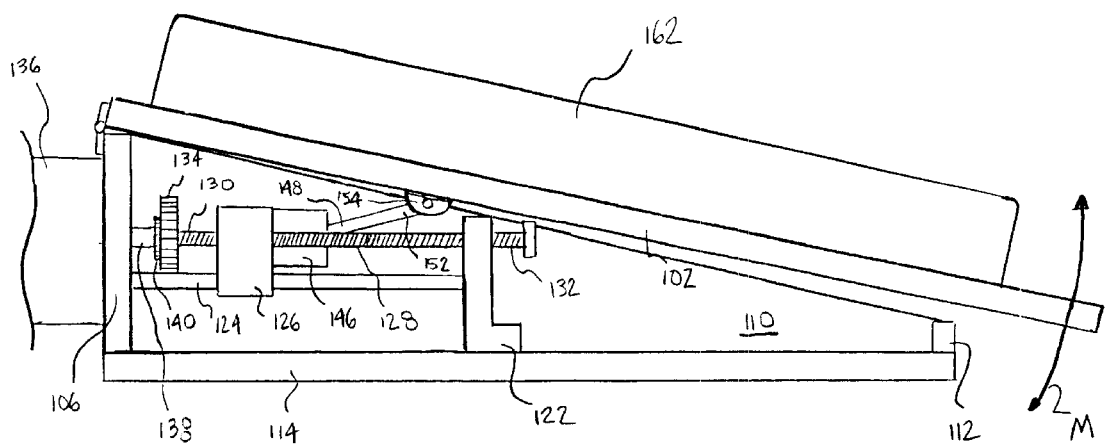
FIG. 5 is a side plan view of the keyboard support platform with the left side plate removed and a keyboard placed on the keyboard support plate.

Referring now to FIG. 3 in conjunction with FIGS. 4 and 5, a drive assembly, generally designated 120, is shown mounted on the bottom plate 114 of the base 104. FIGS. 4 and 5 show that the preferred drive assembly 120 includes a stationary block 122 attached to the bottom plate 114. Two preferably cylindrical guide rails 124 are installed perpendicularly between the rear pivot plate 106 and the stationary block 122. FIG. 4 shows that the rails 124 are parallel to each other and FIG. 5 shows that the rails 124 are parallel to the bottom plate 114.

In the details of one preferred embodiment, a moving block 126 is slidably disposed on the guide rails 124 so that it is parallel to the stationary block 122. A drive screw 128 having a proximal end 130 and a distal end 132 is threaded into a correspondingly sized and tapped hole (not shown) in the moving block 126. Also, a relatively large output gear 134 is rigidly affixed to the proximal end 130 of the drive screw 128. As shown, the drive screw 128 extends through and is radially supported by the stationary block 122. Moreover, a motor 136 is attached to the rear pivot plate 106 of the base 104 and a drive shaft 138 from the motor 136 extends into the interior of the base 104. At least one input gear 140 is attached to the drive shaft 138. The input gear 140 is meshed with the output gear 134. Accordingly, as the drive shaft 138 rotates when the motor 136 is energized, the input gear rotates 140, causing the output gear 134 to rotate. In turn, the drive screw 128 rotates and as it does so, the moving block 126 moves linearly back and forth along the guide rails 124 as indicated by arrows 142, 144. The gear ratio between the input gear 140 and the output gear 134 and the pitch of the drive screw 128 controls the rate of linear motion of the moving block 126 along the guide rails 124.

As shown in FIGS. 4 and 5, in one embodiment, an "L" shaped bracket 146 is rigidly attached to the sliding block 126. FIGS. 4 and 5 also show a moving arm 148 that includes a proximal end 150, and the proximal end 150 is pivotably attached to the bracket 146 by, e.g., a pivot pin. Also, a distal end 152 of the arm 148 is pivotably attached to a support bracket 154 on the keyboard support plate 102. Accordingly, as the moving block 126 slides along the guide rails 124, the "L" shaped bracket 146 transfers the motion of the moving block 126 to the support bracket 154 through the moving arm 148 and the keyboard support plate 102 pivots with respect to the rear pivot plate 106.

Referring specifically to FIG. 4, to cause the motor 136 to periodically reverse when the plate 102 reaches the desired travel limits, a toggle switch 156 is attached to the moving block 126. It is to be understood that the toggle switch 156 is electrically coupled to the motor 136 to control the direction of rotation of the motor 136. As shown in FIG. 4, a first stationary arm 158 and a second stationary arm 160 are placed on each side of the toggle switch 156. The toggle switch 156 and the stationary arms 158, 160 act as a limit switch to change the direction of motion of the moving block 126. Thus, as the toggle switch 156 comes into contact with the first stationary arm 158, the toggle switch 156 is urged into the opposing position to change the direction of the motor 136, and the direction of travel of the moving block 126. The moving block 126 will continue to travel in the opposite direction until the toggle switch 156 is moved by the second stationary arm 160 to return the motor 136 to its original direction of rotation. As long as the motor 136 remains energized, it will continuously drive the moving block 126 back and forth along the guide rails 124. This will cause the keyboard support plate 102 to continuously cycle from a position below horizontal, through a horizontal position, to a position above horizontal.

As intended by the present invention, a keyboard 162 may be placed on the keyboard support plate 102 as shown in FIG. 5. As the keyboard support platform 100 slowly cycles back, as explained above, the user has to follow the keyboard 162 while typing. Thus, the position of the user's wrist changes continuously and the risk of developing Carpal Tunnel Syndrome is reduced.

Figure 6:
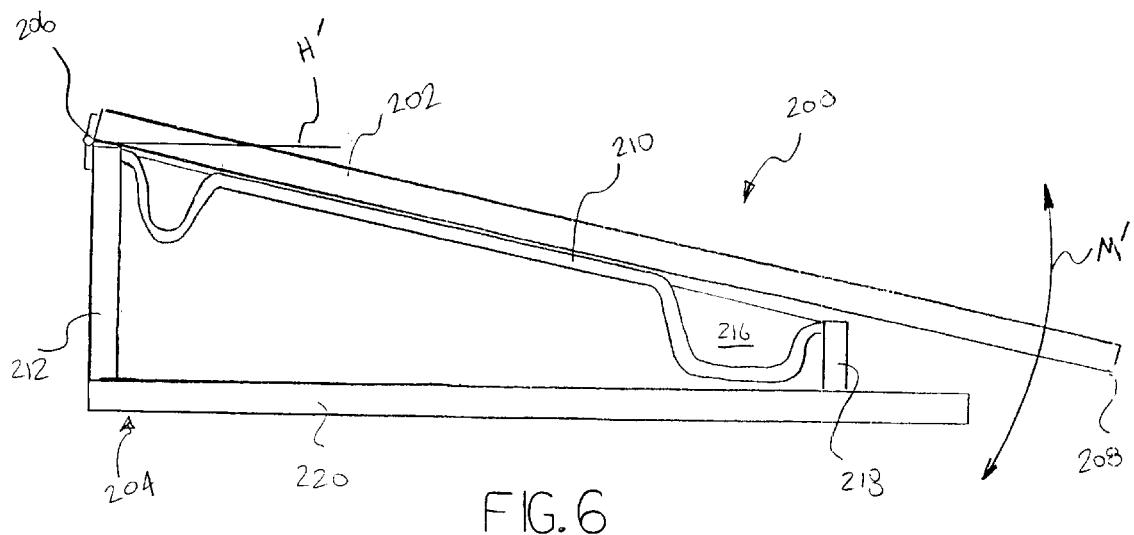
FIG. 6 is a side plan view of an alternative embodiment of the keyboard support platform with the bladder in the deflated configuration.
Figure 7:
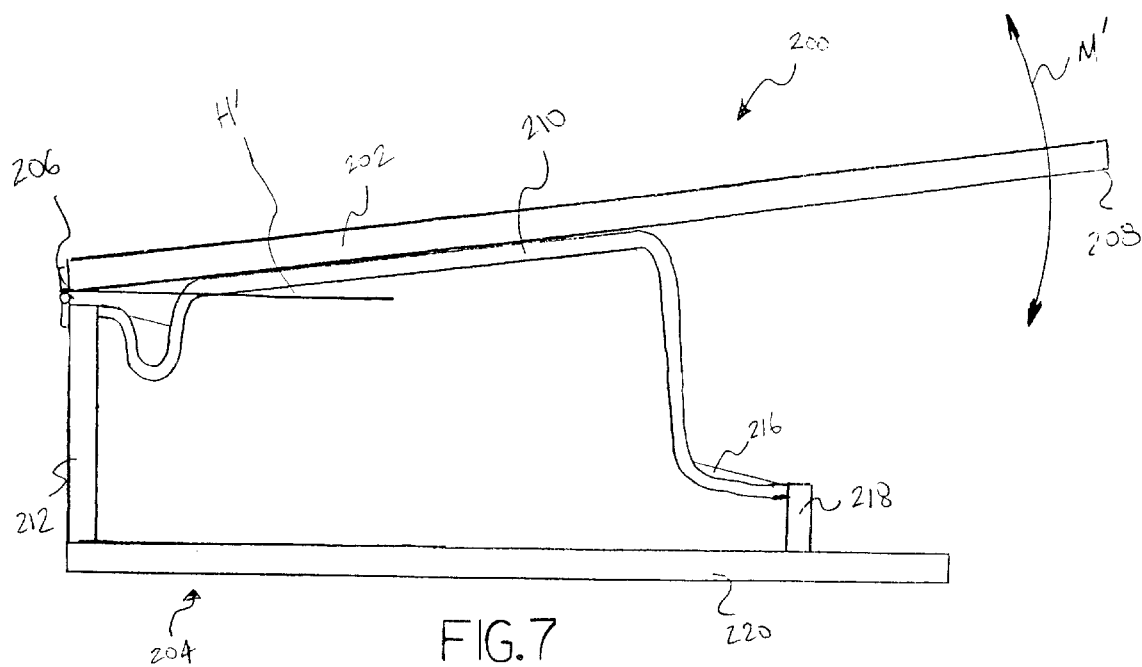
FIG. 7 is a side plan view of the keyboard support platform shown in FIG. 6 with the bladder in the inflated configuration.
Figure 8:
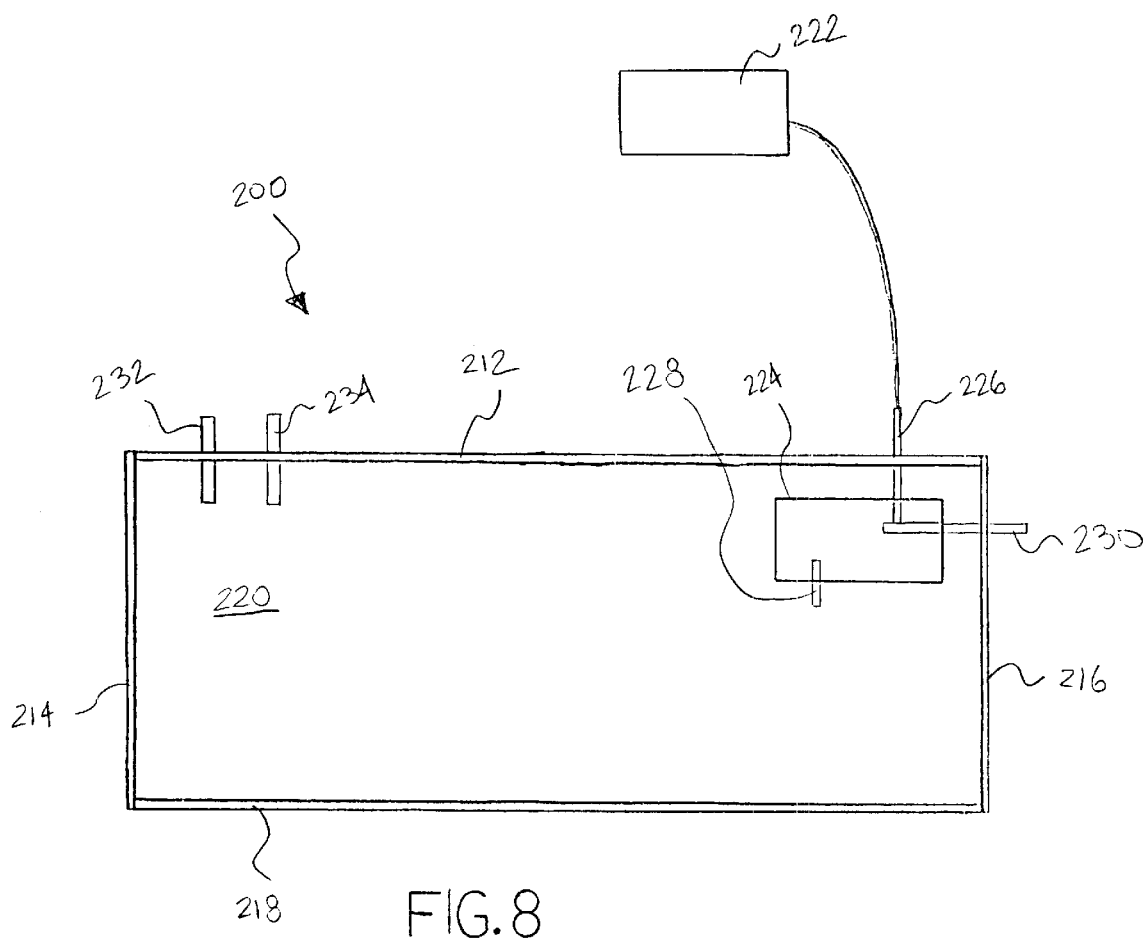
FIG. 8 is an overhead plan view of the keyboard support platform shown in FIG. 6 with the support plate and bladder removed for clarity.

Referring now to FIGS. 6 through 8, an alternative embodiment of the keyboard support platform is shown and generally designated 200. FIGS. 6 through 8 show that this embodiment of the keyboard support platform 200 includes a generally flat keyboard support plate 202 hingedly attached to a hollow, generally box-shaped base 204. The support plate 202 pivots about a rear edge 206, between a tilt down orientation, shown in FIG. 6, wherein the plane of the plate 202 is angled below the horizontal plane "H" that contains the rear edge 206, and a tilt up orientation, shown in FIG. 7, wherein the plane of the plate 202 is angled above the horizon "H'." Thus, the front edge 208 of the plate 202 passes back and forth through the horizontal plane "H" as indicated by motion arrows "M'." It is to be understood that alternatively, the plate 202 can pivot about the front edge 208 in accordance with present principles. FIGS. 6 and 7 show a resilient, airtight bladder 210 disposed within the base 204. When the bladder 210 is inflated and deflated, it moves the support plate 202 back and forth between the tilt down position and the tilt up position. It is to be appreciated that when the bladder 210 is deflated, the support plate 202 is in the tilt down position. Moreover, when the bladder 210 is inflated, the support plate 202 is in the tilt up position.

Referring specifically to FIG. 8, it can be seen that the base 204 includes a rear pivot plate 212, a left side plate 214, a right side plate 216, and a front plate 218. As shown in FIG. 8, the left and right side plates 214, 216 extend perpendicularly from the rear pivot plate 212 and are attached to the front plate 218 to form the exterior wall of the base 204. The exterior wall is attached to a bottom plate 220 to give the base 204 its box shape. FIG. 8 shows that this embodiment of the keyboard support platform 200 includes an air pump 222 that inflates the bladder 210 to raise the support plate 202. Located within the base 204 is a manifold 224. As shown in FIG. 8, the manifold includes an inlet tube 226 that provides fluid communication between the air pump 222 and the manifold 224, a metered manifold outlet valve 228 that provides fluid communication between the manifold 224 and the bladder 210, and a bypass outlet valve 230 that provides fluid communication from the manifold 224 to the ambient atmosphere. FIG. 8 also shows a metered bladder outlet valve 232 that provides fluid communication from the bladder 210 to the ambient atmosphere and a pressure relief outlet valve 234 that provides fluid communication from the bladder 210 to the ambient atmosphere if the pressure within the bladder 210 surpasses a critical level.

As intended by this embodiment of the keyboard support platform 200, the air pump 222 pumps air through the manifold 224, specifically the metered manifold outlet valve 228, into the bladder 210. Accordingly, the bladder 210 inflates and pivots the support plate 202 about the rear edge 206 to the tilt up position. When a predetermined upper pressure limit within the bladder 210, corresponding with the peak angle of the support plate 202, is reached the bypass outlet valve 230 opens and directs the air from the pump 222 directly to the atmosphere without passing into the bladder 210. Therefore, without continued air flow into the bladder 210, air escapes the bladder 210 through the bladder outlet valve 232 until a predetermined lower pressure limit is reached within the bladder 210 causing the bypass outlet valve 230 to close thus, allowing air to again pass into the bladder 210. It is to be appreciated that the manifold outlet valve 228 and the bladder outlet valve 232 are metered to provide a slow, i.e., nearly unnoticeable, rate of inflation and deflation of the bladder. It is to be further appreciated that instead of using pressure, the valves can be controlled by limit switches that are activated when the surface reaches its limits of travel.

It is to be appreciated that the keyboard support platform 100, 200 may be manufactured from aluminum, steel, plastic or any other material with similar characteristics well known in the art. Moreover, it is to be appreciated that the dimensions of the keyboard support platform 100, 200 may be altered such that the keyboard support plate 102, 202 can be attached to the front plate 112, 218 of the base 104, 204. Regardless, the keyboard support plate 102, 202 continuously cycles from a position below horizontal to a position above horizontal. It is also to be appreciated that the keyboard support platform 100, 200 is not limited to the use of supporting a computer keyboard 162. It may be used to support mice, adding machines, calculators, synthesizers, or any other type of device wherein the user may derive a benefit from the continuous changing of the position of the wrist in order to minimize the risk of developing Carpal Tunnel Syndrome.

With the configuration of structure described above, it is to be appreciated that the keyboard support platform 100, 200 provides a keyboard support device that can be used to support a computer keyboard 162 and slowly change the position of the keyboard 162 so that the user will have to follow the keyboard 162 while typing. Accordingly, the position of the user's wrist will change continuously and reduce the risk of developing Carpal Tunnel Syndrome.

While the particular keyboard support platform as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." For example, while the preferred keyboard support plate moves through the horizontal, the pivot arm structure disclosed herein can be used on support plates that do not move through the horizontal. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A keyboard support platform comprising:
   a base;
   a keyboard support plate hingedly attached to the base; and
   a bladder within the base, the bladder being inflatable and deflatable to cause the support plate to pivot with respect to the base from a position below horizontal across a horizontal position to a position above horizontal.

2. The keyboard support platform of claim 1, further comprising:

an air pump communicating with the bladder.

3. The keyboard support platform of claim 2, further comprising:

a bladder outlet valve to allow the bladder to deflate.

4. The keyboard support platform of claim 3, further comprising:

a bypass outlet valve, the bypass outlet valve opening to direct air from the pump directly to the atmosphere when the support plate reaches a maximum position above horizontal and closing to direct air into the bladder when the support plate reaches a maximum position below horizontal.

5. The keyboard support platform of claim 4, further comprising:

a pressure relief outlet valve to relieve pressure within the bladder if the pressure surpasses a predetermined critical level.

6. The device of claim 1, further comprising a rear plate oriented perpendicularly to the base and pivotably coupled to the support plate.

* * * * *